US010712549B2

(12) United States Patent
Balaa (10) Patent No.: US 10,712,549 B2
(45) Date of Patent: Jul. 14, 2020

(54) DEVICE FOR CARRYING OUT LIGHT-SHEET MICROSCOPY (71) Applicant: Karla Balaa, Paris (FR)

(72) Inventor: Karla Balaa, Paris (FR)

(73) Assignee: GATACA SYSTEMS, Vanves (FR)

( * ) Notice: Subject to any disclaimer, the term of this patent is extended or adjusted under 35 U.S.C. 154(b) by 198 days.

(21) Appl. No.: 15/537,634

(22) PCT Filed: Dec. 22, 2015

(86) PCT No.: PCT/FR2015/000236
§ 371 (c)(1),
(2) Date: Jun. 19, 2017

(87) PCT Pub. No.: WO2016/107992
PCT Pub. Date: Jul. 7, 2016

(65) Prior Publication Data
US 2017/0343789 A1 Nov. 30, 2017

(30) Foreign Application Priority Data

Dec. 29, 2014 (FR) .................................... 14 03012

(51) Int. Cl.
G02B 21/00 (2006.01)
G02B 21/06 (2006.01)
(Continued)

(52) U.S. Cl.
CPC ........... G02B 21/367 (2013.01); G02B 21/16 (2013.01); G02B 21/24 (2013.01)

(58) Field of Classification Search
CPC ................ G02B 21/00; G02B 21/0016; G02B 21/0028; G02B 21/0032; G02B 21/0088;
(Continued)

(56) References Cited

U.S. PATENT DOCUMENTS 5,363,190 A * 11/1994 Inaba ..................... G02B 21/32
250/251
2003/0113905 A1* 6/2003 Ho ......................... C12M 41/12
435/287.1
(Continued)

FOREIGN PATENT DOCUMENTS

DE 102012016347 A1 5/2014
WO 2011059826 A2 5/2011
(Continued)

OTHER PUBLICATIONS

Mar. 14, 2016, International Search Report issued for related International Application No. PCT/FR2015/000236.
(Continued)

Primary Examiner — Thong Q Nguyen
(74) Attorney, Agent, or Firm — Young & Thompson (57) ABSTRACT Disclosed is a device for carrying out light-sheet microscopy including: an injector; an immersion chamber; a guide arranged to guide a light beam from the injector and as far as into the immersion chamber along a guiding optical path; a shaper arranged to shape the light beam so as to give it a shape that is elongate along one spatial dimension so as to create a light sheet in a sheet plane located in the immersion chamber; and an objective. The shaper is located along the guiding optical path between the injector and the immersion chamber, and are located between a first plane perpendicular to the optical axis of the objective and passing through the aperture of the immersion chamber and a second plane perpendicular to the optical axis of the objective and located beyond the distal end of the objective relative to the first plane.

20 Claims, 3 Drawing Sheets (51) Int. Cl.
*G02B 21/36* (2006.01)
*G02B 21/16* (2006.01)
*G02B 21/24* (2006.01)

(58) Field of Classification Search
CPC ...... G02B 21/02; G02B 21/06; G02B 21/086; G02B 21/24; G02B 21/248; G02B 21/33; G02B 21/36; G02B 21/361; G02B 21/367
See application file for complete search history.

(56) References Cited

U.S. PATENT DOCUMENTS

| | | |
|---|---|---|
| 2006/0012866 A1 | 1/2006 | Wolleschensky |
| 2006/0033987 A1 | 2/2006 | Stelzer et al. |
| 2009/0174937 A1 | 7/2009 | Holy et al. |
| 2011/0122488 A1* | 5/2011 | Truong .............. G01N 21/6408 359/385 |
| 2011/0134521 A1* | 6/2011 | Truong .............. G01N 21/6408 359/388 |
| 2012/0200693 A1* | 8/2012 | Lippert ................ G02B 21/002 348/79 |
| 2012/0206798 A1* | 8/2012 | Knop .................... G02B 21/002 359/385 |
| 2013/0107358 A1 | 5/2013 | Knebel et al. |
| 2014/0099659 A1 | 4/2014 | Keller |
| 2014/0126046 A1 | 5/2014 | Shroff et al. |
| 2014/0254005 A1 | 9/2014 | Lippert et al. |
| 2014/0353522 A1* | 12/2014 | Wu .................... G01N 15/1434 250/458.1 |
| 2016/0154236 A1* | 6/2016 | Siebenmorgen ... G02B 21/0032 |
| 2018/0052314 A1* | 2/2018 | Brinkman .......... G01N 21/0303 |

FOREIGN PATENT DOCUMENTS

| | | |
|---|---|---|
| WO | 2013053454 A1 | 4/2013 |
| WO | 2007065711 A1 | 6/2014 |

OTHER PUBLICATIONS

Oct. 23, 2015, FR communication issued for related FR application No. 1403012.

Jan Hulsken, et al., Selective plane illumination microscopy techniques in developmental biology, Development, Jun. 2009, pp. 1963-1975, vol. 136, No. 12.

* cited by examiner

DEVICE FOR CARRYING OUT LIGHT-SHEET MICROSCOPY

TECHNICAL FIELD

The present invention relates to a device for carrying out light sheet microscopy. It also relates to a microscope equipped with such a device.

Such a device allows for example a user to carry out light sheet microscopy on an inverted microscope.

STATE OF THE PRIOR ART

Light sheet microscopy (also called SPIM for "Selective Plane Illumination Microscopy") is a reference technique in the field of developmental biology for imaging living things from the cellular scale to the observation of entire embryos. In this technique, the sample is excited by means of a light sheet and the emitted fluorescence is collected perpendicularly to the plane of the light sheet. In this way, it is possible to make observations in 3D with a low level of photobleaching as the light sheet only excites the observed area.

A review of the state of the art is available in the following article: "Selective plane illumination microscopy techniques in developmental biology" Huisken, J. and Stainer, D. (2009).

Since the majority of the samples need to be in a biocompatible medium or contained within a bio-compatible gel in order to remain living during their observation, the SPIM systems are generally designed around an immersion chamber in which the sample is immersed.

In order not to need to use a microscope dedicated to the SPIM technique, several solutions have been developed. The Objective-coupled planar illumination (OCPI) technique described in patents US 20090174937 A1 and US 20140126046 A1 uses an inverted microscope. In this technique, a SPIM device is attached to the frame of the inverted microscope, above the XY translation stage. The optical excitation and reception paths of fluorescence are inclined with respect to the vertical and the sample is fixed to the XY stage. However, this type of solution has the drawback:
  of being bulky, and
  of making the XY movements of the sample using SPIM complex as the plane of the camera is not parallel to the XY axes.

Solutions are also known such as that described in document US 2006/0033987, which itself has the drawback of being bulky.

Several solutions which adapt more easily to a conventional microscope and in which a light beam is reflected in the focal plane of the objective close to the sample have also been developed for SPIM, such as that described for example in document US 20130107358 A1 or US 2006/0012866. Nevertheless, several major drawbacks are observed:
  the proximity of the reflector to the sample limits the movement capabilities and makes these techniques difficult to use with an immersion chamber and samples of large sizes,
  the size of the reflector also limits the maximum numerical aperture of the excitation beam and therefore the maximum thinness of the light sheet,
  finally, in these techniques, the imaging objective cannot be moved without modifying the alignment of the light sheet with the focal plane of the objective; the sample must then be moved instead or the sheet must be realigned at each position.

The purpose of the present invention is to propose a device which (typically by being added to an inverted microscope) makes it possible to carry out SPIM imaging:
  while reducing its bulk, and/or
  while making the movements of the sample less complex, and/or
  while increasing the movement possibilities or the size possibilities of the sample, and/or
  while not limiting the numerical aperture of illumination or of excitation, and/or
  while avoiding modification of the alignment of the light sheet with the observation plane of the objective during its use,
with respect to the state of the prior art.

BACKGROUND OF THE INVENTION

Brief Summary of the Invention

This objective is achieved with a device comprising:
injection means, arranged for injecting a light beam into the device,
an immersion chamber,
guiding means arranged to guide the light beam from the injection means and into the immersion chamber along an optical guide path, and
shaping means, arranged to shape the light beam originating from the injection means so as to give it a shape that is elongated in one spatial dimension so as to create a light sheet in a sheet plane situated in the immersion chamber,
an objective, an observation plane of which is situated in the immersion chamber and is perpendicular to an optical axis of the objective, said objective comprising a distal end orientated towards the immersion chamber and a proximal end.

The immersion chamber typically comprises an aperture and a bottom.

The distal end of the objective is preferably situated on the side of the bottom of the immersion chamber. The aperture of the immersion chamber, the sheet plane and the distal end of the objective are preferably aligned in this order.

The shaping means preferably form part of the guiding means and are preferably situated along the optical guide path between the injection means and the immersion chamber.

The shaping means are preferably situated between:
  a first plane perpendicular to the optical axis of the objective and passing through the aperture of the immersion chamber and
  a second plane perpendicular to the optical axis of the objective and situated beyond the distal end of the objective with respect to the first plane.

The shaping means can comprise transformation means, arranged in order to transform the light beam so that:
  before transformation by the transformation means, the light beam does not have a favoured direction of elongation in a plane perpendicular to its direction of propagation, and
  so that after transformation by the transformation means, the light beam has a favoured direction of elongation in a plane perpendicular to its direction of propagation,
the transformation means being situated on a portion of the optical path along which the light beam moves parallel to the optical axis of the objective.

The optical guide path can comprise at least:
a first portion of optical path arranged so that the light beam propagates in a first direction of propagation, then
a second portion of optical path arranged so that the light beam propagates in a second direction of propagation opposite to the first direction,
the first direction being parallel to the optical axis of the objective.

The shaping means can comprise a cylindrical lens and/or an oscillating mirror.

The shaping means are preferably situated outside the objective.

Preferably, the optical guide path does not pass through the objective.

The injection means are preferably arranged for injecting the light beam into the device so that during its injection the light beam moves parallel to the optical axis of the objective.

The guiding means are preferably arranged so that the entire optical guide path between the injection means and the immersion chamber is situated between the first plane and the second plane.

The bottom of the immersion chamber can comprise the distal end of the objective so that no intermediate exists between the inside of the immersion chamber and the distal end of the objective.

The objective is preferably an immersion objective.

The guiding means are preferably arranged so that the light beam enters the immersion chamber through a face of the immersion chamber different from the bottom of the immersion chamber.

The guiding means can be arranged so that the direction of propagation of the light beam during its entry into the immersion chamber is perpendicular to the optical axis of the objective.

The injection means, the objective, the immersion chamber, the guiding means and the shaping means can be secured together and arranged so that a movement of the objective:
does not modify either an angle of incidence or a position or a size of the light beam on the shaping means,
does not modify the relative positions of the observation plane of the objective and of the sheet plane.

The observation plane of the objective can be situated in the sheet plane in the immersion chamber.

The second plane can intersect the device according to the invention at a fastening means arranged for fastening the device according to the invention by optically connecting the objective to a microscope objective holder.

According to yet another aspect of the invention, a microscope is proposed equipped with a device according to the invention, characterized in that the microscope is an inverted microscope comprising an objective holder and in that the objective of the device according to the invention is mounted on the objective holder of the inverted microscope.

DESCRIPTION OF FIGURES AND EMBODIMENTS

Other advantages and features of the invention will become apparent on examination of the detailed description of implementations and embodiments which are in no way limitative, and the following attached drawings.

As these embodiments are in no way limitative, it is possible in particular to consider variants of the invention comprising only a selection of characteristics described or shown below, in isolation from the other characteristics described or shown (even if this selection is isolated within a sentence containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention from the state of the prior art In the following description, reference is made to an orthogonal system of coordinates in which:
the X axis is orientated horizontally in the plane of FIGS. 1 to 3 and 6 to 7 and horizontally perpendicularly to the plane of FIG. 8,
the Y axis is orientated horizontally perpendicularly to the plane of FIGS. 1 to 3 and 6 to 7 and horizontally in the plane of FIG. 8, and
the Z axis is orientated vertically in the plane of FIGS. 1 to 3 and 6 to 8.

Figure 1:
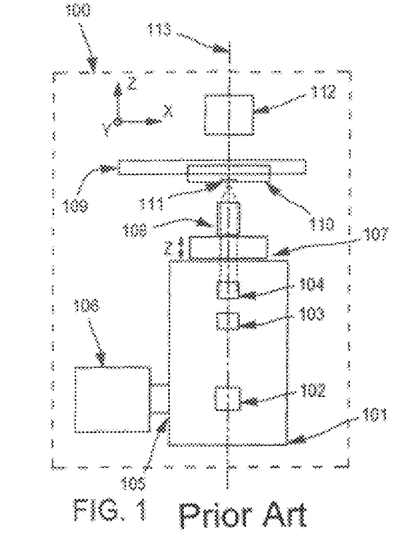
FIG. 1 shows a standard inverted microscope 100 according to the state of the prior art and its associated elements.

FIG. 1 shows a standard inverted microscope 100 according to the state of the prior art and its associated elements. The frame 101 of the microscope has an objective holder 107 generally in the form of a multi-objective turret. The sample 111 held by a sample holder 110 is observed through the objective 108 of the microscope and the detection path which contains one or more cube filter(s) 104 used for the epi-illumination of the sample, a tube lens 103 and a reflector 102 which sends the image of the sample to a detection port of the microscope. A camera 106 is situated at the end of the detection path using a connecting part 105, which is usually a C-mount. A light source 112 centred on the axis 113 of the objective of the microscope is used for carrying out transmission microscopy.

The positioning of the sample 111 with respect to the objective is ensured by a stage 109 which moves in the X and Y directions. The movement in the Z direction is carried out by moving the objective holder 107 vertically. A second movement in the Z direction is possible if the stage is equipped with motorization in the Z direction. This motorization in the Z direction is generally a piezo-electric motor used for producing a rapid response over a limited travel.

A first embodiment of a device 200 according to the invention will now be described with reference to FIGS. 2 to 6, incorporated into the microscope of FIG. 1 so as to form a microscope 1000 according to the invention. This microscope 1000 according to the invention will only be described in terms of its differences with respect to the microscope 100 of FIG. 1.

Figure 2:
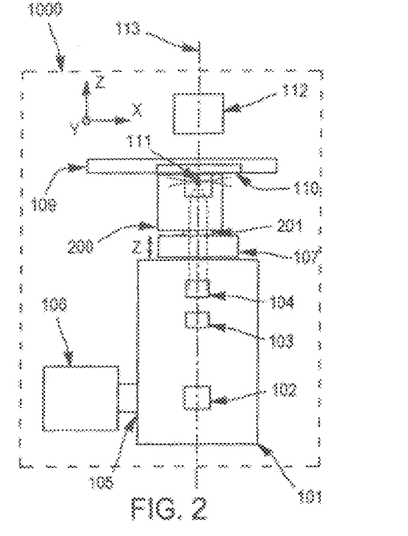
FIG. 2 is a diagrammatic profile view of a first embodiment of a microscope 1000 according to the invention comprising a device 200 according to the invention.

The microscope 1000 is identical to the microscope 100, except in that the objective 108 is replaced by the device 200 and in that the sample holder 110 is modified.

Figure 3:
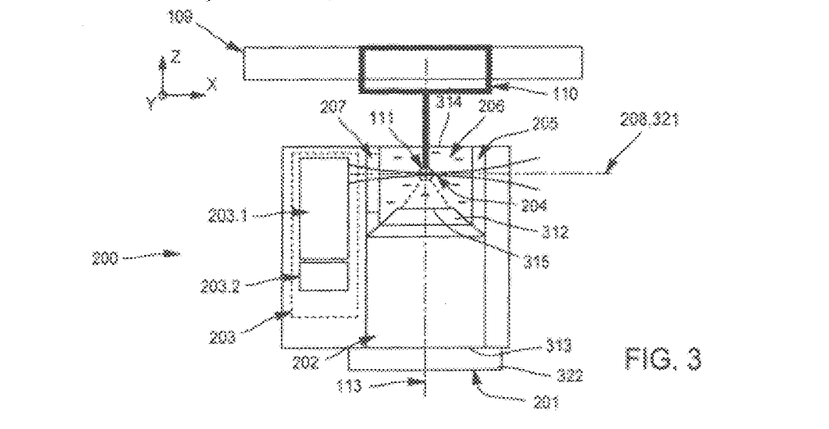
FIG. 3 is a diagrammatic profile view of a part of the microscope 1000 of FIG. 2.

The device 200 comprises:
injection means 203.2, arranged for injecting a light beam 306 into the device 200,
an immersion chamber 205,
guiding means 203.1 (also referenced 301 to 305) arranged for guiding the light beam 306 from the injection means 203.2 and into the immersion chamber 205 along an optical guide path 307-310 (which does not pass through the objective 202), and
shaping means 302, 303, 305, arranged for shaping the light beam 306 (having initially at the level of the injection means 203.2 a central symmetry in a plane perpendicular to the direction of propagation of the beam 306) originating from the injection means 203.2 so as to give it (continually or on average over time), in a plane perpendicular to the direction of propagation of the beam 306, a shape that is elongated in one spatial dimension 311 so as to create a light sheet 204 in a sheet plane 321 situated in the immersion chamber 205, and
an objective 202, an observation plane 208 of which (preferably consisting of a focal plane of the objective 202 at a wavelength of interest which can be identical to or different from a wavelength of the beam 306) is situated in the immersion chamber 205 and is perpendicular to an optical axis 113 (preferably vertical) of the objective 202, said objective 202 comprising a distal end 312 orientated towards the inside of the immersion chamber 205 and a proximal end 313, these two ends 312 and 313 being aligned along the optical axis 113.

The sheet plane 321 is perpendicular (or substantially perpendicular plus or minus ten degrees) to the axis 113.

The immersion chamber 205 is fastened to the objective 202 in an sealed fashion to allow it to be filled with the immersion medium 206 of the objective 202.

The proximal end 313 is arranged so that a light spot:
at the wavelength of interest, and
originating from the focal plane 208 for this wavelength of interest, and
imaged by the objective 202
is collimated at the level of the proximal end 313.

The immersion chamber 205 comprises an aperture 314 situated upwards and a bottom 315 situated downwards.

Taking the vertical axis 113, the aperture 314 is defined as the total aperture, in a horizontal plane, allowing entry to and exit from the chamber 205, this horizontal plane passing through the maximum level of liquid that can be reached inside the chamber 205 (assuming that this maximum level is planar, i.e. disregarding the effects of surface tension or of wetting by the liquid on the inner walls of the chamber 205).

The aperture 314 is thus a hole arranged in order to allow a sample 111 to pass from the outside of the chamber to the inside of the chamber 205, and/or from the inside of the chamber 205 to the outside of the chamber, even when the chamber 205 is filled with the immersion medium 206 and in a state of use with the light sheet 204 inside, without losing or spilling immersion medium 206 out of the chamber 205. The aperture 314 is thus not a window, a window being a fastening closed by a pane or a slide that is necessary a priori for retaining the immersion medium when the light sheet is created.

The distal end 312 of the objective 202 is situated on the side of the bottom 315 of the immersion chamber 205 so that the aperture 314 of the immersion chamber 205, the sheet plane 321 and the distal end 312 of the objective 202 are aligned perpendicular to the sheet plane 321 and/or along the axis 113 (vertically, from top to bottom) in this order.

Figure 6:
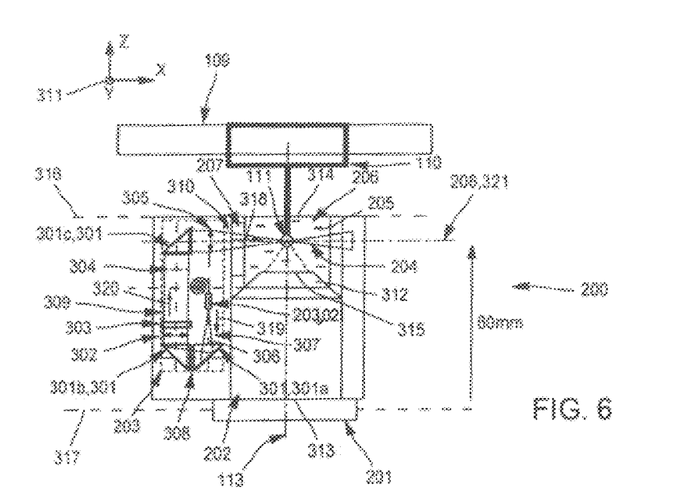
FIG. 6 is a diagrammatic profile view of a part of the microscope 1000 of FIG. 2, this view being more detailed than FIG. 3.

The shaping means 302, 303, 305 typically comprise:
transformation means 303, arranged for transforming the beam 306 so that:
before transformation by means 303, the beam 306 does not have a favoured direction of elongation (for its shape and/or its light intensity distribution) in a plane perpendicular to its direction of propagation (i.e. its shape has central symmetry in this plane perpendicular to its direction of propagation), and
after transformation by the means 303, the beam 306 has a preferred direction of elongation (for its shape and/or its light intensity distribution) in a plane perpendicular to its direction of propagation (i.e. for example it has an oval shape in this plane perpendicular to its direction of propagation)
focusing means 302, 305, arranged in order to modify the focusing of the beam 306.

The transformation means 303 (and even the shaping means 302, 303, 305) form part of the guiding means 203.1 and are situated along the optical guide path 307-310 between the injection means 203.2 and the immersion chamber 205.

The transformation means 303 (and even the shaping means 302, 303, 305) are situated between:
a first plane 316 (typically horizontal) perpendicular to the optical axis 113 of the objective 202 and passing through the aperture 314 of the immersion chamber 205 and
a second plane 317 (typically horizontal) perpendicular to the optical axis 113 of the objective 202 and situated beyond the distal end 312 of the objective 202 with respect to the first plane 316 (i.e. the first plane 316, the distal end 312 and the second plane 317 are placed successively in this order along the axis 113), this second plane preferably passing through the proximal end 313 of the objective.

The transformation means 303 are situated on a portion 309 of the optical path 307-310 along which the light beam 306 moves parallel (or substantially parallel plus or minus ten degrees) to the optical axis 113 of the objective 202.

The optical guide path 307-310 comprises at least:
a first portion 307 (typically vertical) of optical path arranged so that the light beam 306 propagates in a first direction of propagation 319 (this first portion being situated from the injection means 203.2 to a first optical reflection element 301a), then
an intermediate portion 308 (typically horizontal) situated from the first optical reflection element 301a to a second optical reflection element 301b,
a second portion 309 (typically vertical) of optical path arranged so that the light beam 306 propagates in a second direction of propagation 320 opposite to the first direction 319 (this second portion being situated from the second optical reflection element 301b to a third optical reflection element 301c), then
a last portion 310 (typically horizontal) situated from the third optical reflection element 301c to the immersion chamber 205, the first direction 319 being parallel (or substantially parallel plus or minus ten degrees) to the optical axis 113 of the objective 202.

The transformation means 303 typically comprise:
a cylindrical lens (case shown in FIGS. 4 to 6) arranged for shaping the light beam 306 originating from the injection means 203.2 so as to give it (in a plane perpendicular to its direction of propagation) continually over time a shape that is elongated in one spatial dimension 311 in the plane 208 or 321, and/or
an oscillating mirror (case not shown, but typically this mirror can be situated as a reflector referenced 301c on FIG. 6, situated at the end of the portion 309, in combination or not in combination with the cylindrical lens 303) arranged for shaping the light beam 306 originating from the injection means 203.2 so as to give it (in a plane perpendicular to its direction of propagation) on average over time (typical frequency greater than 100 Hz) a shape that is elongated in one spatial dimension 311 in the plane 208 or 321.

The transformation means 303 (and even the shaping means 302, 303, 305) are situated outside the objective 202.

The injection means 203.2 are arranged for injecting the light beam 306 into the device 200 so that during its injection the light beam 306 moves parallel (or substantially parallel plus or minus ten degrees) to the optical axis 113 of the objective 202.

The guiding means 203.1 are arranged so that the entire optical guide path 307-310 between the injection means 203.2 and the immersion chamber 205 is situated between the first plane 316 and the second plane 317.

The bottom 315 of the immersion chamber 205 comprises the distal end 312 of the objective 202 so that no intermediate exists between the inside of the immersion chamber 205 and the distal end 312 of the objective.

The guiding means 203.1 are arranged so that the light beam 306 enters the immersion chamber 205 through a vertical face (or window) 207 of the immersion chamber 205 different from the bottom 315 of the immersion chamber 205. This window 207 is transparent (i.e. it preferably allows at least 80% of the light intensity to pass) at least a wavelength of the beam 306 making it possible for the light sheet to penetrate into the chamber 205.

The guiding means 203.1 are arranged so that the direction of propagation 318 of the light beam 306 during its entry into the immersion chamber 205 is perpendicular (or substantially perpendicular plus or minus ten degrees) to the optical axis 113 of the objective 202.

The injection means 203.2, the objective 202, the immersion chamber 205, the guiding means 203.1 and the transformation means 303 (and even the shaping means 302, 303, 305) are secured together (preferably within the same case or the same frame 322) and arranged so that a movement of the objective 202:
does not modify either an angle of incidence or a position or a size of the light beam 306 on the transformation means 303 (and even on the shaping means 302, 303, 305)
does not modify the relative positions of the observation plane 208 of the objective 202 and of the sheet plane 321 (or of the light sheet 204).

The observation plane 208 of the objective 202 is situated in the sheet plane 321 in the immersion chamber 205.

The second plane 317 intersects the device 200 at a fastening means (coupling piece) 201 arranged for fastening the device 200 by opto-mechanically connecting the objective 202 with the objective holder 107 of the microscope.

The fastening means 201 does not comprise screw threads, as this would make fastening by turning the device 200 difficult in the small volume available between the objective holder 107 and the sample holder 110. Instead, the fastening means 201 comprise snap-fitting means or also a dovetail system.

The microscope 1000 is equipped with the device 200;

The microscope 1000 is an inverted microscope comprising the objective holder 107.

The objective 202 of the device 200 is mounted (preferably via the frame 322) on the objective holder 107 of the inverted microscope 1000, so that the objective 202 and the objective holder 107 share the same optical axis.

The sample 111, mounted on a pin forming part of the sample holder 110, one end of which holds the sample 111, is immersed in the chamber 205 (the sample can also be attached to a microscope slide inclined with respect to the observation plane 208 of the objective 202).

The positioning of the sample 111 with respect to the objective 202 is ensured by the stage 109 which moves horizontally in the two perpendicular directions X and Y. The vertical movement in the Z direction is carried out by moving the objective holder 107 vertically. A second movement in the Z direction is possible as the stage is equipped with a motorization in the Z direction. This motorization in the Z direction is in general a piezo-electric motor used for producing a rapid response over a limited travel.

The sample holder 110 can comprise means of rotation arranged in order to turn the sample:
about the axis 113 of the objective, and/or
about an axis contained in the observation plane 208 of the objective 202.

The chamber 205 is equipped with at least two pipes (not shown) for renewing the immersion medium 206.

FIG. 2 shows the inverted microscope 1000 and its associated elements equipped with the device according to the invention 200 making it possible to add to the microscope the possibility of carrying out SPIM. The opto-mechanical device 200 is attached to the objective holder 107 of the microscope using the coupling piece 201, in such a way that the axis 113 of the objective coincides with the axis of the detection path of the microscope 1000. The detection axis 113 of the device 200 coincides with the detection axis of the microscope. In this way, the device 200 can be used to carry out SPIM, epi-fluorescence, confocal and/or transmission microscopy. The detection path of the microscope 1000 typically comprises at least one array detector, preferably fixed to an imaging port of the microscope 1000. The observation field of the objective 202 can be observed using SPIM and another imaging technique of the microscope 1000 with the same detector.

FIG. 3 shows the case in which the device 200 is attached to the objective holder 107 of the inverted microscope 1000 using the coupling piece 201. This embodiment contains as objective 202 an immersion objective corrected to infinity which is centred on the detection axis 113 and on which the immersion chamber 205 is fastened in a sealed manner. The immersion chamber 205 has its aperture 314 at the top and it is filled with a bio-compatible immersion medium 206. The chamber 205 also has the window 207 which is transparent to light on one of its sides.

An opto-mechanical sub-assembly 203 is fastened to the frame 322 of the device 200, and contains:
- the guiding means (an optical element) 203.1, and
- the injection means (an optical element) 203.2
- mechanical elements for holding the different optical elements (guiding means 203.1 and injection means 203.2) in place, and optionally to adjust their position during factory assembly.

The injection means 203.2 only comprise or consist of:
- a light source (for example a laser diode or Light-Emitting Diode or "LED"), or
- the output of an optical fiber (shown in FIGS. 4, 5 and 6) or a connector arranged in order to connect an optical fiber, the beam 306 of which is formatted for the optical system including the optical elements in order to form a light sheet 204.

The opto-mechanical sub-assembly 203 (comprising the guiding means 203.1 and the injection means 203.2) is positioned so that the light sheet 204 enters the immersion chamber 205 through the window 207 and so that it is superimposed on the observation plane 208 of the objective 202 which is perpendicular to the detection axis 113.

Figure 4:
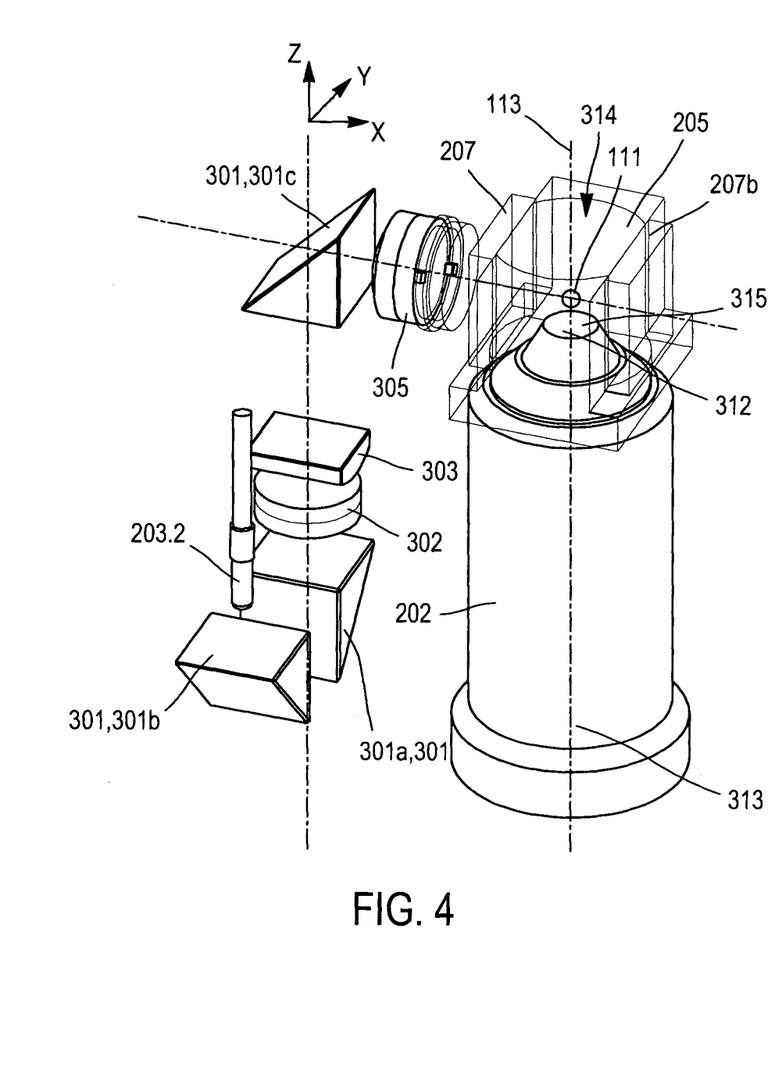
FIG. 4 is a perspective view of different optical elements of the device 200 according to the invention of the microscope 1000 of FIG. 2.

FIG. 4 is a perspective view of different optical elements of the device 200 according to the invention of the microscope 1000 of FIG. 2.

Figure 5:
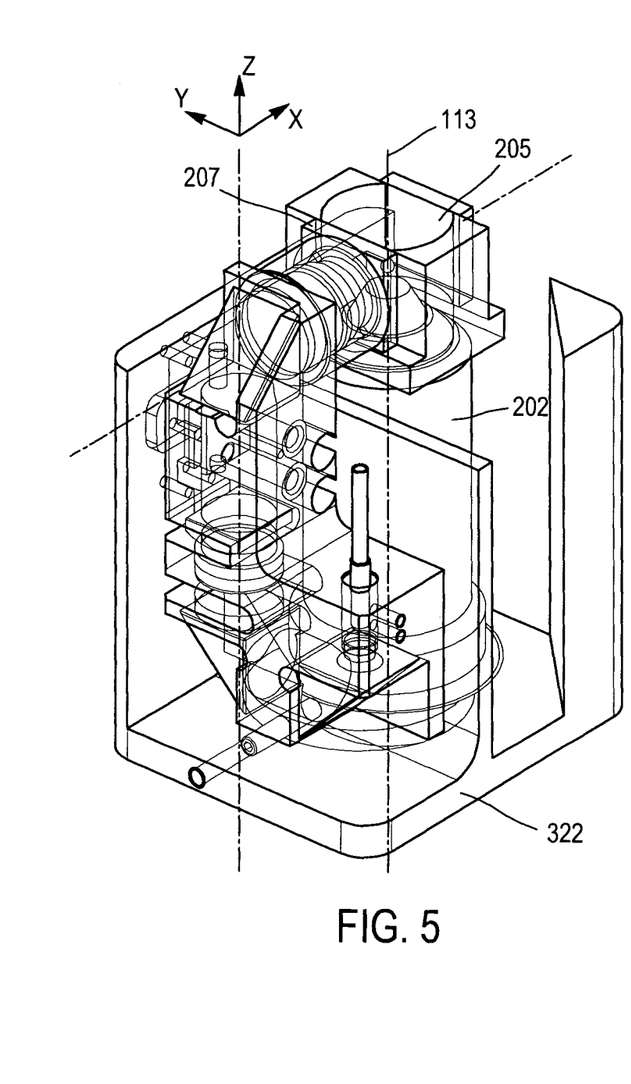
FIG. 5 is a perspective view of different optical elements and of mechanical parts of the device 200 according to the invention of the microscope 1000 of FIG. 2.

FIG. 5 is a perspective view of different optical elements and of mechanical parts of the device 200 according to the invention of the microscope 1000 of FIG. 2. These mechanical parts for assembly of the different optical elements allow an accurate positioning of these different optical elements, in particular during manufacture of the device 200 according to the invention.

All the reflections by the elements 301a, 301b and 301c can be, according to the variant considered:
- either in different planes, as shown in FIGS. 4 and 5,
- or in one and the same plane, as shown in FIG. 6.

FIG. 6 shows a diagram, consistent with FIG. 3, in which the guiding means 203.1 have been detailed.

The injection means 203.2 are constituted by the output of a single-mode fibre (for the wavelength interval from 400 to 650 nm) in which several lasers having different emission wavelengths have been injected (wavelength interval from 400 to 650 nm of the beam 306). The output of this fibre is situated at the focus of an achromatic lens 302 having a focal length of 40 mm (AC40-49326/Edmund Optics) so as to create a collimated light beam 306.

The cylindrical lens 303 has a focal length of 20 mm (LJ1960L1/Thorlabs) and focuses the beam 306 along a line on an axis 304 constituted by the intersection:
- of a (horizontal) plane perpendicular to the axis of the objective 113, and
- a (vertical) plane parallel to the direction 320 of propagation of the beam 306 at the level of this line.

This line is approximately situated in the rear focal plane of an achromatic lens 305 having a focal length of 20 mm (AC-asph20-49659, Edmund Optics).

Thus, the transformation means 303 (cylindrical lens) focus the beam 306 along the path 307-310 before the chamber 205.

The transformation means 303 (cylindrical lens) focus the beam 306 along the path 307-310 before a convex lens 305 situated before the chamber 205 (and even before the reflector 301c).

After having passed through the glass window 207 which is 3 mm thick, the beam 306 is thus focused, in the immersion medium 206, along a horizontal line situated in the observation plane 208 on or close to the optical axis 113. The optical path 307 to 310 is folded using right-angle prisms 301 (MRA12-E02, Thorlabs) respectively 301a, 301b and 301c in order the beam 306 passing onto these prisms. The objective 202 incorporated in the device 200 is a 40× objective (Nikon, CFI APO 40× W NIR, NA 0.8) with a numerical aperture equal to 0.8.

As for the maximum illumination or excitation aperture, it is 0.24 in this configuration.

It is noted that the device 202:
- is very compact and entirely contained between the two planes 316 and 317, and
- allows simple movements of the sample 111 in the observation plane 208 via the sample holder 110, and
- has the size of the chamber 205 as the only limit on the movement or the size of the sample 111, and
- gives the possibility of a high numerical aperture with an immersion objective 202,
- makes to possible to avoid modifying the alignment of the light sheet 204 with the observation plane 208 of the objective 202 during its use.

Figure 7:
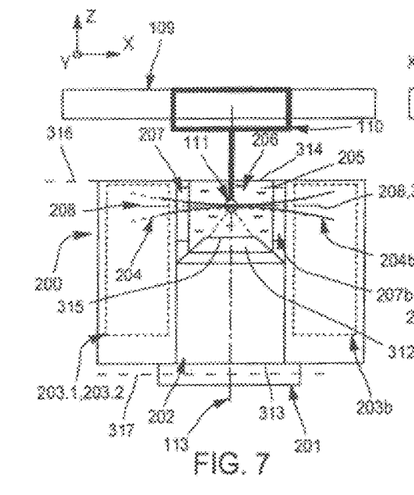
FIG. 7 is a diagrammatic profile view of a part of a second embodiment of a microscope according to the invention comprising a second embodiment of device 200 according to the invention.

FIG. 7 shows a second embodiment of a device 200 according to the invention in a second embodiment of a microscope according to the invention, similar to that described with reference to FIG. 6 and in which the frame 322 of the device 200 contains a second sub-assembly 203b (identical to the first sub-assembly 203 but arranged symmetrically with the first assembly 203 with respect to the objective 202) which forms a second light sheet 204b. The two light sheets 204 and 204b formed by means of the two sub-assemblies 203 and 203b propagate in opposite directions and are superimposed in the observation plane 208 of the objective 202. The immersion chamber 205 has, in this case, at least two side windows 207 and 207b on opposite faces for the two light sheets 204 and 204b to pass through.

Figure 8:
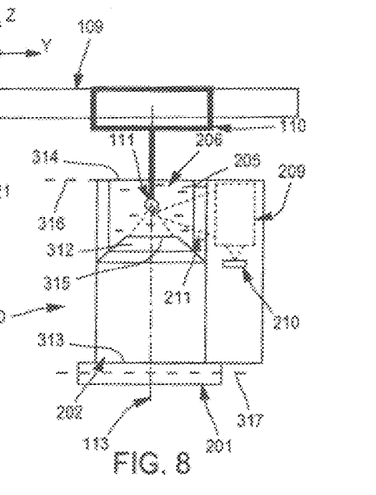
FIG. 8 is a diagrammatic profile view of a part of a third embodiment of a microscope according to the invention comprising a third embodiment of a device 200 according to the invention.

FIG. 8 shows a third embodiment of a device 200 according to the invention in a third embodiment of a microscope according to the invention, similar to that described with reference to FIG. 6 or FIG. 7, in which an opto-mechanical sub-assembly 209 and a detector 210 (typically a camera 210) are attached to the frame 322 of the device 200 for laterally imaging the sample 111 (and optionally also its surrounding area). In this case, the immersion chamber 205 has a side window 211 which is not necessarily facing the window 207. The light sheet 204 does not enter the chamber 205 through the window 211. The opto-mechanical sub-assembly 209 and the detector 210 are arranged in order to detect an optical signal originating from the sample 111 or from the chamber 205 through this window 211.

The opto-mechanical 209 system is preferably arranged in order to take an image of the sample 211 and of its surrounding area on the detector 210 so as to observe the relative position of the sample 111 with respect to the sample holder 110 and to the immersion objective 202.

Of course, the invention is not limited to the examples which have just been described and numerous adjustments can be made to these examples without exceeding the scope of the invention.

Of course, the different characteristics, forms, variants and embodiments of the invention can be combined together in various combinations to the extent that they are not incompatible or mutually exclusive. In particular all the variants and embodiments described previously can be combined together.

The invention claimed is:

1. A device comprising:
an immersion chamber comprising an aperture and a bottom;
an injection system configured to inject a light beam and guide the light beam to the immersion chamber;
a guiding system configured to guide the light beam from the injection system and into the immersion chamber along an optical guide path;
a shaping system configured to shape the light beam originating from the injection system to give the light beam a shape that is elongated in one spatial dimension to create a light sheet in a sheet plane situated in the immersion chamber;
an objective having an observation plane situated in the immersion chamber and perpendicular to an optical axis of the objective, the objective comprising a distal end oriented towards the immersion chamber and a proximal end, the distal end of the objective being situated on a side of the bottom of the immersion chamber; and
a sample holder configured to hold a sample while immersing the sample in the immersion chamber through the aperture,
wherein the aperture of the immersion chamber, the sheet plane, and the distal end of the objective are aligned in this order, and
wherein the shaping system forms part of the guiding system, is situated along the optical guide path between the injection system and the immersion chamber, and is situated between a first plane perpendicular to the optical axis of the objective and passing through the aperture of the immersion chamber and a second plane perpendicular to the optical axis of the objective and situated beyond the distal end of the objective with respect to the first plane.

2. The device according to claim 1, wherein the shaping system comprises a transformation system configured to transform the light beam so that:
before transformation by the transformation system, the light beam does not have a favored direction of elongation in a plane perpendicular to its direction of propagation, and
after transformation by the transformation system, the light beam has a favored direction of elongation in a plane perpendicular to its direction of propagation, and
wherein the transformation system is situated on a portion of the optical path along which the light beam moves parallel to the optical axis of the objective.

3. The device according to claim 2, wherein the optical guide path comprises at least:
a first portion of the optical guide path arranged so that the light beam propagates in a first direction of propagation, and
a second portion of the optical guide path arranged so that the light beam propagates in a second direction of propagation opposite to the first direction,
the first direction being parallel to the optical axis of the objective.

4. The device according to claim 2, wherein the shaping system comprises one or more of a cylindrical lens and an oscillating mirror.

5. The device according to claim 2, wherein the shaping system is situated outside the objective.

6. The device according to claim 1, wherein the optical guide path comprises at least:
a first portion of the optical guide path arranged so that the light beam propagates in a first direction of propagation, and
a second portion of the optical guide path arranged so that the light beam propagates in a second direction of propagation opposite to the first direction,
the first direction being parallel to the optical axis of the objective.

7. The device according to claim 6, wherein the shaping system is situated outside the objective.

8. The device according to claim 1, wherein the shaping system comprises one or more of a cylindrical lens and an oscillating mirror.

9. The device according to claim 8, wherein the shaping system is situated outside the objective.

10. The device according to claim 1, wherein the shaping system is situated outside the objective.

11. The device according to claim 1, wherein the optical guide path does not pass through the objective.

12. The device according to claim 1, wherein the injection system is configured to inject the light beam into the device so that during injection the light beam moves parallel to the optical axis of the objective.

13. The device according to claim 1, wherein the guiding system is disposed so that the entire optical guide path between the injection system and the immersion chamber is situated between the first plane and the second plane.

14. The device according to claim 1, wherein the bottom of the immersion chamber comprises the distal end of the objective so that no intermediate exists between an inside of the immersion chamber and the distal end of the objective.

15. The device according to claim 1, wherein the guiding system is disposed so that the light beam enters the immersion chamber through a face of the immersion chamber different from the bottom of the immersion chamber.

16. The device according to claim 1, wherein the guiding system is disposed so that a direction of propagation of the light beam during its entry into the immersion chamber is perpendicular to the optical axis of the objective.

17. The device according to claim 1, wherein the injection system, the objective, the immersion chamber, the guiding system, and the shaping system are secured together and arranged so that a movement of the objective:
does not modify either an angle of incidence or a position or a size of the light beam on the shaping system, and
does not modify relative positions of the observation plane of the objective and of the sheet plane.

18. The device according to claim 1, wherein the observation plane of the objective is situated in the sheet plane in the immersion chamber.

19. The device according to claim 1, wherein the second plane intersects the device at a fastening system configured to fasten the device by optically connecting the objective to an objective holder of the microscope.

20. A microscope equipped with the device according to claim 1, wherein the microscope is an inverted microscope comprising an objective holder, and
wherein the objective of the device is mounted on the objective holder of the inverted microscope.

* * * * *